April 16, 1957 G. BARDINI 2,788,736
FRUIT PEEL PRESS
Filed Jan. 19, 1956 2 Sheets-Sheet 1

INVENTOR.
GINO BARDINI
BY
ATTORNEY

April 16, 1957 G. BARDINI 2,788,736
FRUIT PEEL PRESS
Filed Jan. 19, 1956 2 Sheets-Sheet 2
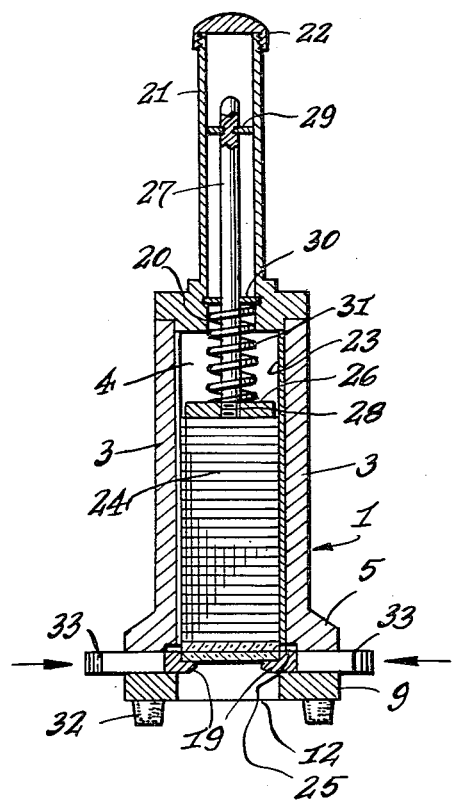
Fig-5-
INVENTOR.
GINO BARDINI
BY W. Lee Helms
ATTORNEY.

United States Patent Office 2,788,736
Patented Apr. 16, 1957

2,788,736

FRUIT PEEL PRESS

Gino Bardini, New York, N. Y.

Application January 19, 1956, Serial No. 560,154

6 Claims. (Cl. 100—232)

The present invention relates to a device for expressing oil from fruit peels. Oil expressed from the peel of fruit such as lemons, oranges, etc. is commonly used for the flavoring of certain beverages, such as cafe espresso, tea, cocktails or other alcoholic beverages, etc. Fruit peel oil is also commonly used for the flavoring of various food products.

The expressing of fruit peel oil for the above mentioned purposes has heretofore been accomplished usually by squeezing the fruit peel or skin between the fingers. It is an object of the present invention to provide a device for expressing the oil from fruit peels with minimum effort, and with minimum contact with the human hand. Said device also makes it possible to express a maximum amount of oils from the fruit peel.

A further object of the invention is to provide a fruit peel press which is simple and cheap to construct and easily repaired or replaced.

My invention will be described with reference to the accompanying drawings, in which—

Figure 1:
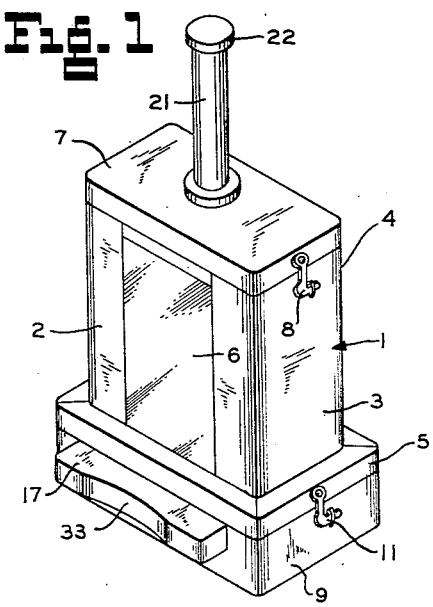
Fig. 1 is a view in perspective of a fruit peel press embodying the invention.
Figure 3:
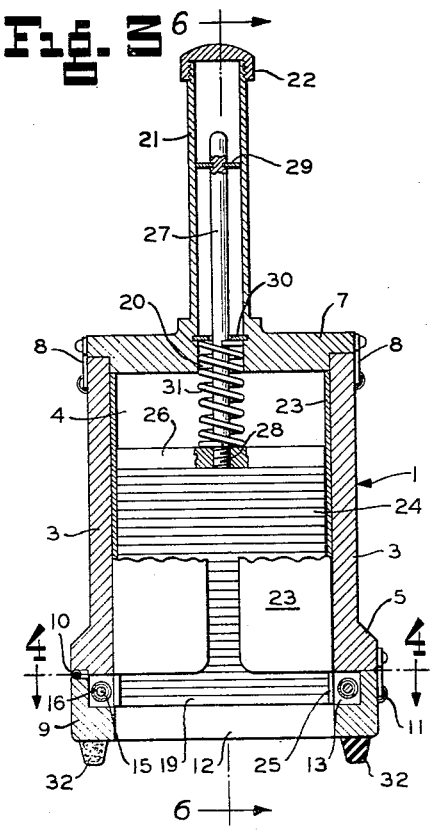
Fig. 3 is a sectional view of the press taken along line 3—3 of Fig. 2, a cartridge containing fruit peel slices being mounted therein, and the bottom half of the cartridge and all of the peel slices being shown in elevation.
Figure 2:
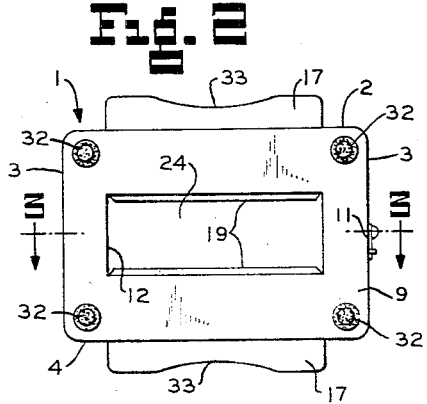
Fig. 2 is a bottom plan view of the press shown in Fig. 1.
Figure 4:
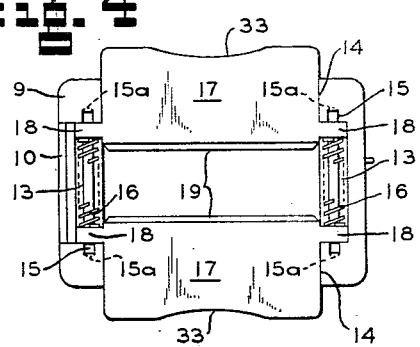
Fig. 4 is a top plan view of the lower closure member of the press of Figs. 1–3, as viewed along line 4—4 of Fig. 3.
Figure 5:
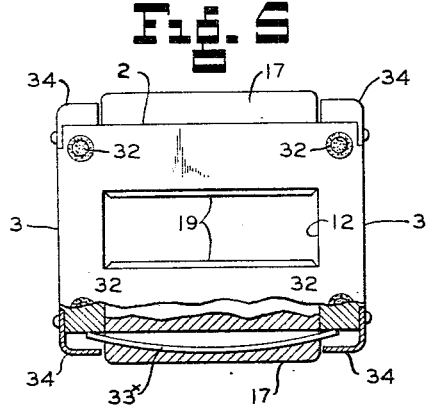

Fig. 5 is a view similar to Fig. 2, but illustrating a modified spring mechanism for holding the presser plates in open position, the view being partly in section to disclose the spring construction; and Fig. 6 is a sectional view of the press taken along line 6—6 of Fig. 3, the peel slices being shown in elevation, except for the lowermost two slices, and the outer portions of the presser plates likewise being shown in elevation.

Referring to the drawings, there is shown at 1 a box-like housing having generally rectangular walls and open at the top and bottom, said housing comprising a front wall 2, side walls 3, back wall 4 and enlarged flange-base 5. Front wall 2 has a window therein, preferably of a transparent plastic material. This window 6 may be of any desired size, being designed to enable a view of the contents of the housing.

Housing 1 is covered at the top by a lid member 7, the latter being removably fastened to the housing by any suitable means, hook-and-eye fasteners 8 being shown as an example.

Housing 1 is covered at the bottom by a base member 9, member 9 being hinged at 10 to flange-base 5, and fastened to base 5 at the side thereof opposite the hinge by any suitable means such as hook-and-eye 11. Member 9 has a rectangular opening 12 therethrough, equal in size to, and aligned with, the bottom opening of housing 1. The side walls of base member 9 are of L-shaped cross section, thus providing recesses 13 therein. Each of the front and back walls of member 9 has a channel 14 therethrough, being centrally disposed and extending for a substantial distance along the top of the wall, and having a flat bottom on a level with the bottom areas of recesses 13. The channels 14 are aligned one with the other.

A pin 15 carrying a coil spring 16 is suspended between the front and back walls of each recess 13, the pin ends being press fitted into sockets 15a. Pin 15 is held parallel to the side and bottom walls of the recess. A generally rectangular presser plate 17 rests slidably within each of the channels 14, and extend outwardly from base 9 for a short distance. Plate 17 is provided with a flange 18 extending from each side thereof and approximately in line with its inner edge. The flanges 18 are centrally apertured, and each pin 15 passes through the opposed flanges of the two presser plates. Each presser plate has a short blade-like flange 19 extending inwardly therefrom and for the length of the plate, and in line with the bottom plate surface.

Lid member 7 is provided with a centrally disposed circular aperture 20 therethrough, above which extends a hollow cylindrical tube 21. Tube 21 is closed at its outer end by a removable cap 22.

Mounted within housing 1, and preferably in a box-like cartridge 23, is a stack of fruit peels 24 (e. g. lemon peels). Cartridge 23 is open at the top and bottom, and the fruit peel slices therein are of such size that the bottom peel will rest on flanges 19 and thus support the peel stack. A flange 25 extends downwardly from each side of cartridge 23, its lower end being in line with the horizontal surface of recess 13. The flanges 25 provide support at the sides for the lowermost peels in the stack, and in addition prevent contact between the latter and the springs 16. These flanges are centrally positioned, and are of such width so as to permit the flanges 18 to come sufficiently close together when the presser plates are operated. It will be noted that the flanges 19 of the presser plates are beveled at each end, so as to prevent possible contact with the flanges 25 when the presser plates are brought together.

Pressing upon the stack of peels from the top is a plunger consisting of a flat plate 26 and a rod 27 extending upwardly therefrom and into tube 21. Rod 27 is threaded at its lower end, and is screwed into an internally threaded aperture 28 in plate 26. A stop ring 29 is mounted on rod 27 close to its outer end, and tube 21 is adapted for the sliding therein of rod 27 bearing said stop ring. A second stop ring 30 is mounted within tube 21 at the base thereof, this second ring being only large enough to allow for the passage of rod 27.

A coil spring 31 is carried by plunger rod 27. Spring 31 bears at its lower end against the upper surface of plate 26, and at its upper end against stop ring 30. Plate 26 is, consequently, spring loaded, spring 31 being long enough when fully opened to maintain constant pressure on the stack of fruit peels until the last peel is in position on flanges 19.

In operating my fruit peel press, when loaded as illustrated in Figs. 3 and 6, the presser plates 17 are manually pressed together in the direction of the arrows in Fig. 6 against the action of the spring 16. As a result the lowermost slice of fruit peel is squeezed to force out juice therefrom through the bottom opening 12. The presser plates are then allowed to spring back, and the peel slice, having become somewhat curved in cross-section and hence of less width than that between the flanges 19, drops down by gravity. A fresh slice of peel is then forced into place by the spring loaded plunger.

In order to facilitate the gripping and squeezing of the peel slice, the presser plates 17 may be roughened or provided with teeth (not shown), along their inner edges adjacent the flanges 19.

My fruit peel press is thus adapted to store a supply of peel slices, and provides a method of squeezing and then disposing of each slice, one by one. The press may be set on the dining table or beverage bar, legs 32 of rubber or other suitable material being provided on the under surface of base member 9. When some peel oil is desired, the device provides a most easy and rapid dispensing thereof. In order to facilitate the operation of the presser plates, curved depressions 33 are formed along the outer plate edges, serving as finger rests.

It will be noted that my fruit peel press is designed for utmost ease of assembly, loading, cleaning and repair. If a cartridge for the peels is employed, it may be loaded into housing 1 from the top or bottom, but preferably from the top. If no cartridge is employed, the peels can be loaded conveniently only from the top. In the latter case, a slightly larger plunger plate than that used with a cartridge should be employed. Since plate 26 simply screws onto rod 27, interchangeable plates are possible.

If the press is to be disassembled for cleaning or repair, plate 26 is removed from rod 27, spring 31 withdrawn from the rod, cap 22 removed from the end of tube 21, and the rod then withdrawn through the outer end of the tube.

It will be understood that tube 21 is long enough to receive the full length of rod 27. Consequently the plunger can be raised to the top of housing 1, and the housing completely filled with fruit peels (except for the space occupied by plate 26).

My fruit peel press is preferably constructed of non-corrodible material. Examples of such materials are stainless steel, aluminum, and various plastics.

Referring to Fig. 5, a modification of the spring mechanism for the presser plates is shown. In place of inner springs 18 a curved strip of spring metal 33X passes through the outwardly exposed portion of presser plate 19, the strip 33X being attached at its ends to base member 9. Shields 34 may be attached to base member 9 to cover the exposed ends of strip 33X.

Having now described my invention, what I now claim and desire to secure by Letters Patent is as follows:

1. A fruit peel press adapted to express oil from fruit peel slices, comprising a box-like enclosure having a bottom opening therein, two alined horizontally disposed presser plates, said presser plates having an open, spaced apart position for supporting therebetween at least one horizontally disposed peel slice above and in line with said bottom housing opening each of said presser plates bearing an inwardly directed horizontal flange for supporting said peel slices, at least one said plate being movable toward the other said plate and being adapted to squeeze one said peel slice between said plates for expressing oil therefrom, and spring means for returning said presser plates to said open position after the squeezing of a peel slice, said bottom opening and plates in open position being adapted to allow a squeezed peel slice to drop from said enclosure by gravity.

2. A fruit peel press adapted to express oil from fruit peel slices, comprising a box-like enclosure having a bottom opening therein, two alined horizontally disposed presser plates, said presser plates having an open, spaced apart position for supporting therebetween at least one horizontally disposed peel slice above and in line with said bottom housing opening each of said presser plates bearing an inwardly directed horizontal flange for supporting said peel slices, said plates being movable toward each other and being adapted to squeeze one said peel slice therebetween for expressing oil therefrom, and spring means mounted between said presser plates for returning them to said open position after the squeezing of a peel slice, said bottom opening and plates in open position being adapted to allow a squeezed peel slice to drop from said enclosure by gravity.

3. A fruit peel press adapted to express oil from fruit peel slices, comprising a box-like enclosure having a bottom opening therein, two alined horizontally disposed presser plates, said presser plates having an open, spaced apart position for supporting a stack of fruit peel slices above and in line with said bottom housing opening each of said presser plates bearing an inwardly directed horizontal flange for supporting said peel slices, at least one said plate being movable toward the other said plate and being adapted to squeeze one said peel slice between said plates for expressing oil therefrom, spring means for returning said presser plates to said open position after the squeezing of a peel slice, said bottom opening and plates in open position being adapted to allow a squeezed peel slice to drop from said enclousre by gravity, and a spring-loaded plunger mounted in said enclosure and adapted to exert pressure on said stack of peel slices for moving successive peel slices into position for squeezing by said presser plates.

4. A fruit peel press adapted to express oil from fruit peel slices, comprising a box-like enclosure having a bottom opening therein, two alined horizontally disposed presser plates, said presser plates having an open, spaced apart position for supporting a stack of fruit peel slices above and in line with said bottom housing opening each of said presser plates bearing an inwardly directed horizontal flange for supporting said peel slices, at least one said plate being movable toward the other said plate and being adapted to squeeze one said peel slice between said plates for expressing oil therefrom, spring means for returning said presser plates to said open position after the squeezing of a peel slice, said bottom opening and plates in open position being adapted to allow a squeezed peel slice to drop from said enclosure by gravity, and a cartridge open at least at the bottom and mounted in said enclosure for holding therein said stack of peel slices.

5. A fruit peel press in accordance with claim 1, in which the said spring means comprises at least one strip of spring metal, said strip being mounted on the outside of said enclosure and passing through said plate and being adapted to maintain said plate in said open position.

6. A fruit peel press in accordance with claim 2, in which the said spring means comprise two pins mounted horizontally within said enclosure on opposite sides of said bottom opening, each said pin bearing a coil spring, and in which each presser plate has a flange extending from each side thereof, said side flanges being slidable on said pins outwardly of said coil springs.

References Cited in the file of this patent

UNITED STATES PATENTS

| | | |
|---|---|---|
| 1,229,733 | Errett | June 12, 1917 |
| 1,870,327 | Endsley | Aug. 9, 1932 |
| 2,220,458 | Osterman | Nov. 5, 1940 |
| 2,255,449 | Mutchler | Sept. 9, 1941 |